US012596546B2

(12) United States Patent
Hallett et al.

(10) Patent No.: US 12,596,546 B2
(45) Date of Patent: *Apr. 7, 2026

(54) METHODS AND SYSTEMS FOR UPDATING DEVICE FIRMWARE WHILE MAINTAINING STATE AND CONNECTIVITY

(71) Applicant: SK Hynix NAND Product Solutions Corp., Rancho Cordova, CA (US)

(72) Inventors: Timothy Hallett, Oronoco, MN (US); Bindu Madhavi Khambam, Folsom, CA (US); Kailaash Rajagopalan, Folsom, CA (US); Mahesh Govindane, Rancho Cordova, CA (US); Matthew Fitzpatrick, Valley Springs, CA (US); Sam Povilus, Boulder, CO (US); John Nolan, Grass Valley, CA (US); Jonathan M. Hughes, Longmont, CO (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,310

(22) Filed: May 24, 2024

(65) Prior Publication Data

US 2024/0311141 A1    Sep. 19, 2024

Related U.S. Application Data

(63) Continuation of application No. 17/860,807, filed on Jul. 8, 2022, now Pat. No. 12,026,506.

(51) Int. Cl.
*G06F 11/07* (2006.01)
*G06F 8/65* (2018.01)
(Continued)

(52) U.S. Cl.
CPC ............ *G06F 8/656* (2018.02); *G06F 3/0607* (2013.01); *G06F 3/0634* (2013.01);
(Continued)

(58) Field of Classification Search
CPC . G06F 8/656; G06F 8/654; G06F 8/65; G06F 8/61; G06F 8/71; G06F 8/67;
(Continued)

(56) References Cited

U.S. PATENT DOCUMENTS 8,015,392 B2    9/2011  Naik et al.
8,499,144 B2    7/2013  Conklin et al.
(Continued)

FOREIGN PATENT DOCUMENTS

EP        2743828 A1    6/2014
EP        3171267 A1    5/2017

OTHER PUBLICATIONS

Jianhua Wang, Research on Remote Updating Technology of Multi-core Network Simulation Software, 2019 IEEE, [Retrieved on Apr. 4, 2024], Retrieved from the internet: <URL: https://ieeexplore.ieee.org/stamp/stamp.jsp?tp=&arnumber=8669633> 5 Pages (202-206) (Year: 2019).

*Primary Examiner* — Anibal Riveracruz
(74) *Attorney, Agent, or Firm* — HG Law LLP

(57) ABSTRACT

A system and related method, including a first processor core, a second processor core and a control circuitry to receive requests to update existing firmware of the first processor core to a new firmware. The control circuitry loads existing firmware onto the second processor core and migrates data associated with the existing firmware on the first processor core to the second processor core. The control circuitry stops the transaction execution by the first processor core while causing the second processor core to execute transactions in place of the first processor core. The control (Continued)

circuitry restarts the first processor core, replaces the existing firmware on the first processor core with the new firmware, and migrates data of the existing firmware on the second processor core to the first processor core. The control circuitry stops the transaction execution of the second processor core and causes the first processor core to execute transactions.

21 Claims, 6 Drawing Sheets

(51) Int. Cl.

| | |
|---|---|
| *G06F 8/656* | (2018.01) |
| *G06F 9/30* | (2018.01) |
| *G06F 9/38* | (2018.01) |
| *G06F 9/445* | (2018.01) |
| G06F 3/06 | (2006.01) |
| G06F 8/61 | (2018.01) |
| G06F 8/654 | (2018.01) |
| G06F 8/71 | (2018.01) |
| G06F 9/4401 | (2018.01) |
| G06F 9/48 | (2006.01) |
| G06F 9/50 | (2006.01) |
| G06F 11/00 | (2006.01) |
| G06F 11/14 | (2006.01) |
| G06F 11/22 | (2006.01) |

(52) U.S. Cl.
CPC .......... *G06F 3/0653* (2013.01); *G06F 3/0679* (2013.01); *G06F 8/61* (2013.01); *G06F 8/65* (2013.01); *G06F 8/654* (2018.02); *G06F 8/71* (2013.01); *G06F 9/3877* (2013.01); *G06F 9/4401* (2013.01); *G06F 9/4403* (2013.01); *G06F 9/4405* (2013.01); *G06F 9/4411* (2013.01); *G06F 9/44505* (2013.01); *G06F 9/44557* (2013.01); *G06F 9/4843* (2013.01); *G06F 9/5027* (2013.01); *G06F 9/505* (2013.01); *G06F 11/004* (2013.01); *G06F 11/0724* (2013.01); *G06F 11/0751* (2013.01); *G06F 11/0793* (2013.01); *G06F 11/1433* (2013.01); *G06F 11/1435* (2013.01); *G06F 11/2284* (2013.01)

(58) Field of Classification Search
CPC .. G06F 9/4401; G06F 9/4411; G06F 9/44505; G06F 9/3877; G06F 9/505; G06F 9/4403; G06F 9/4405; G06F 9/4843; G06F 9/5027; G06F 9/44557; G06F 11/004; G06F 11/1435; G06F 11/1433; G06F 11/0751; G06F 11/0793; G06F 11/2284; G06F 11/0724; G06F 3/0607; G06F 3/0634; G06F 3/0653; G06F 3/0679; G06F 3/061
See application file for complete search history.

(56) References Cited

U.S. PATENT DOCUMENTS

| | | | | |
|---|---|---|---|---|
| 10,289,408 | B2 | 5/2019 | Gerhart et al. | |
| 10,572,166 | B1 | 2/2020 | Douglass et al. | |
| 11,899,612 | B2* | 2/2024 | Xiang | G06F 13/32 |
| 12,254,304 | B2* | 3/2025 | Seater | G06F 1/28 |
| 2011/0099544 | A1 | 4/2011 | Haramiishi et al. | |
| 2015/0067666 | A1 | 3/2015 | Henry et al. | |
| 2016/0266894 | A1 | 9/2016 | Panicker et al. | |
| 2017/0090908 | A1 | 3/2017 | Tian et al. | |
| 2017/0123780 | A1 | 5/2017 | Albot et al. | |
| 2018/0173182 | A1 | 6/2018 | Miller et al. | |
| 2020/0257518 | A1* | 8/2020 | Liedtke | G06F 8/65 |
| 2020/0310788 | A1* | 10/2020 | Zimmer | G06F 8/65 |
| 2020/0410097 | A1 | 12/2020 | Miller | |
| 2021/0064471 | A1 | 3/2021 | Park et al. | |
| 2021/0089296 | A1* | 3/2021 | Banik | G06F 9/4843 |
| 2022/0107797 | A1 | 4/2022 | Kim et al. | |
| 2022/0164196 | A1 | 5/2022 | Beckett et al. | |
| 2024/0012635 | A1 | 1/2024 | Hallett et al. | |
| 2024/0103720 | A1* | 3/2024 | Am | G06F 8/656 |
| 2024/0248702 | A1* | 7/2024 | Nachimuthu | G06F 8/65 |

\* cited by examiner

100

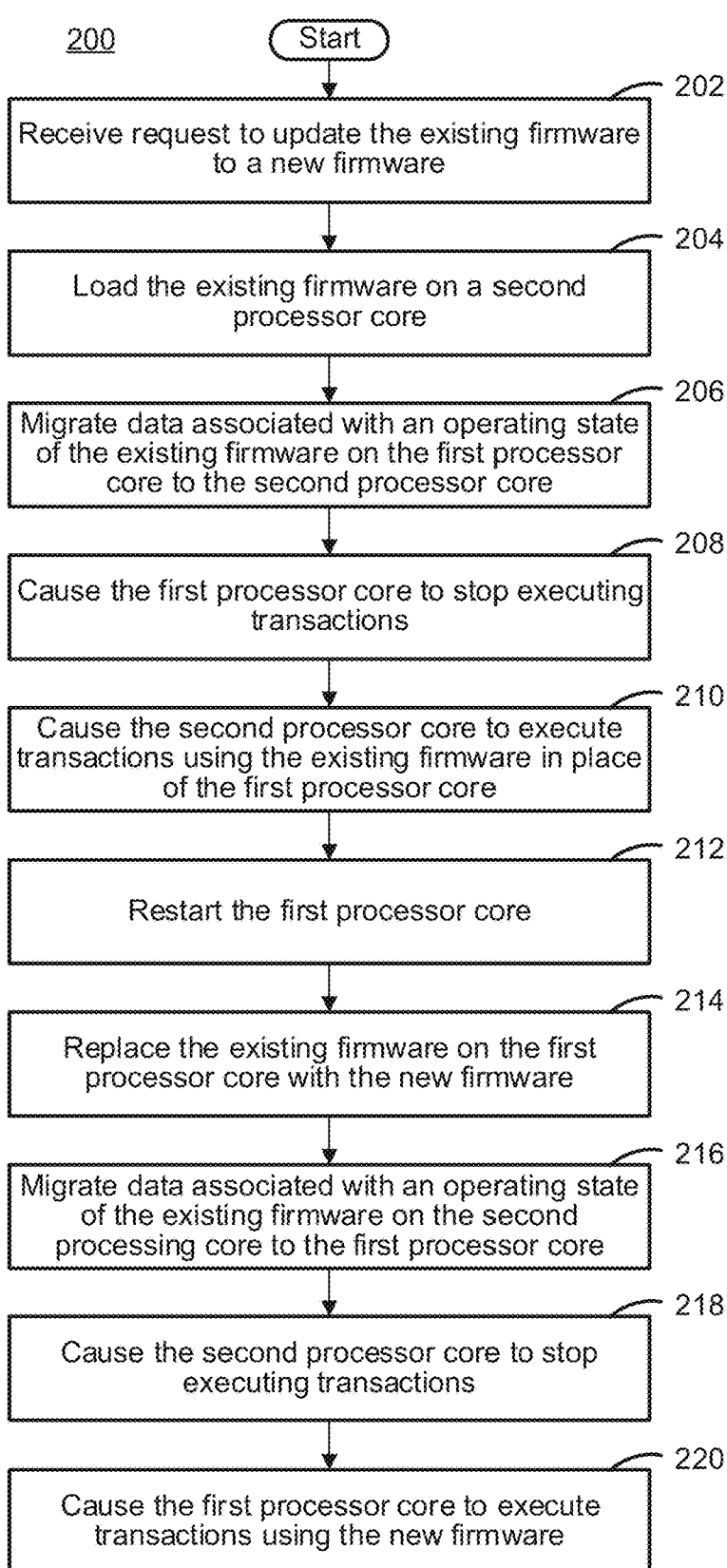

200

Start

202
Receive request to update the existing firmware to a new firmware

204
Load the existing firmware on a second processor core

206
Migrate data associated with an operating state of the existing firmware on the first processor core to the second processor core 208
Cause the first processor core to stop executing transactions 210
Cause the second processor core to execute transactions using the existing firmware in place of the first processor core 212
Restart the first processor core 214
Replace the existing firmware on the first processor core with the new firmware 216
Migrate data associated with an operating state of the existing firmware on the second processing core to the first processor core 218
Cause the second processor core to stop executing transactions 220
Cause the first processor core to execute transactions using the new firmware

Migrate data from second processor core to first processor core — 402

Pause second processor core — 404

Migrate Standalone Traffic Manager from the second processor core to the first processor core — 406

Connect Traffic Manager to Control Manager — 408

Deassert pause processing bit — 410

METHODS AND SYSTEMS FOR UPDATING DEVICE FIRMWARE WHILE MAINTAINING STATE AND CONNECTIVITY

CROSS-REFERENCE TO RELATED APPLICATION

This application is a continuation of U.S. patent application Ser. No. 17/860,807, filed Jul. 8, 2022, now U.S. Pat. No. 12,026,506, the disclosure of which is hereby incorporated by reference herein in its entirety.

TECHNICAL FIELD

The present disclosure is related to systems and methods for updating an existing firmware on a device to a new firmware, and more particularly, the present disclosure is related to updating existing firmware on a device to a new firmware while maintaining state data and connectivity on the device.

BACKGROUND

Devices (e.g., storage devices) may be connected to a Peripheral Component Interconnect Express (PCIe) interface or other interfaces. During the operation of the device, the firmware of the processor cores may require an update while at least one core is executing commands or instructions, which may result in throughput inefficiencies.

SUMMARY

In accordance with the present disclosure, systems and methods are provided for a dynamic firmware update application that operates on a device, such as on a solid-state drive (SSD) device, while maintaining operating states, data, and connectivity. For example, an SSD device that has a controller, a multi-core processor, an existing firmware on the processor cores and is currently executing transactions receives a request to update the existing firmware to a new firmware. The dynamic firmware update application may be implemented at least in part on the controller using software, hardware, or a combination thereof. In some embodiments, the firmware cannot be updated until all outstanding transactions are executed, and all cores are available to reset to load the new firmware. This may take an extended period of time and therefore poses issues when the firmware needs to be updated promptly. Moreover, updating the firmware of a processor core can cause compatibility issues between that processor core and other processor cores.

According to the present disclosure, in some embodiments, while the outstanding transactions may continue to execute on a first processor core, the dynamic firmware update application searches for an available processor core that can load the existing firmware to act as a standalone processor core as the first processor core updates to the new firmware. In some embodiments, the dynamic firmware update application further includes determining that the second processor core is available before proceeding with the firmware update. Data, such as outstanding transactions, operating states, and connectivity states are migrated from the first processor core to the second processor core so that the first processor core can stop executing, restart, and have the existing firmware replaced with the new firmware. In this manner, the dynamic firmware update application runs with two data migration handoffs to ensure that outstanding transactions are executed while the firmware on the first processor core is being updated.

In some embodiments, the dynamic firmware update application receives a request to update the existing firmware of the first processor core to the new firmware. The dynamic firmware update application then loads an existing firmware on a second processor core and migrates data associated with an operating state of the existing firmware on the first processor core to the second processor core. In some embodiments, the dynamic firmware update application further causes the first processor core to stop executing transactions while causing the second processor core to execute transactions using the existing firmware in place of the first processor core. In some embodiments, the dynamic firmware update application further restarts the first processor core, replaces the existing firmware on the first processor core with the new firmware, and migrates data associated with an operating state of the existing firmware on the second processor core to the first processor core. In some embodiments, the dynamic firmware update application further causes the second processor core to stop executing transactions and causes the first processor core to execute transactions with the new firmware.

In some embodiments, the dynamic firmware update application can be used to update firmware of any suitable device having multiple cores coupled to a peripheral component interconnect (PCIe) interface. In some embodiments, the device may, for example, be any suitable storage device that may communicate over the PCIe interface by using a Non-Volatile Memory Express (NVMe) standard protocol. The Non-Volatile Memory Express (NVMe) industry standard protocol defines a register level interface for a host system to communicate with the device (e.g., SSD or HDD) over the Peripheral Component Interconnect Express (PCIe) bus. In some embodiments the dynamic firmware update application can be used to update firmware of any suitable device having multiple cores coupled to an ethernet interface.

In some embodiments, migrating data associated with the operating state of the existing firmware on the first processor core to the second processor core further includes loading the data associated with the operating state of the existing firmware on the first processor core onto an available area of memory associated with the second processor core. In some embodiments, the data associated with the operating state of the existing firmware on the first processor core and the new firmware on the second processor core include a plurality of outstanding transactions, a state of the respective firmware, and an input/output connectivity state of the respective firmware, each of which can be migrated between the processor cores. In some embodiments, restarting the first processor core occurs after the second processor core begins to execute the transactions and before replacing the existing firmware on the first processor core.

In some embodiments, the solid-state drive (SSD) device is provided having a processor and a controller that are communicatively coupled to each other. In some embodiments, the processor includes at least a first processor core and a second processor core. In some embodiments, the processor is a multi-core processor with more than two processor cores. In some embodiments, the controller is configured to receive a request to update the existing firmware to the new firmware, load the existing firmware on the second processor core, migrate data associated with an operating state of the existing firmware on the first processor core to the second processor core. The controller is further configured to cause the first processor core to stop executing transactions while causing the second processor core to execute transactions using the existing firmware in place of the first processor core, and while causing the first processor core to restart. In some embodiments, the controller is further configured to replace the existing firmware on the first processor core with the new firmware, migrate data associated with an operating state of the existing firmware on the second processor core to the first processor core, cause the second processor core to stop executing transactions, and cause the first processor core to execute transactions using the new firmware.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

FIG. 2 shows a flowchart illustrating a process for updating the existing firmware of the first processor while continuing to execute transactions on the second processor core, in accordance with some embodiments of the present disclosure;

DETAILED DESCRIPTION

Figure 1:
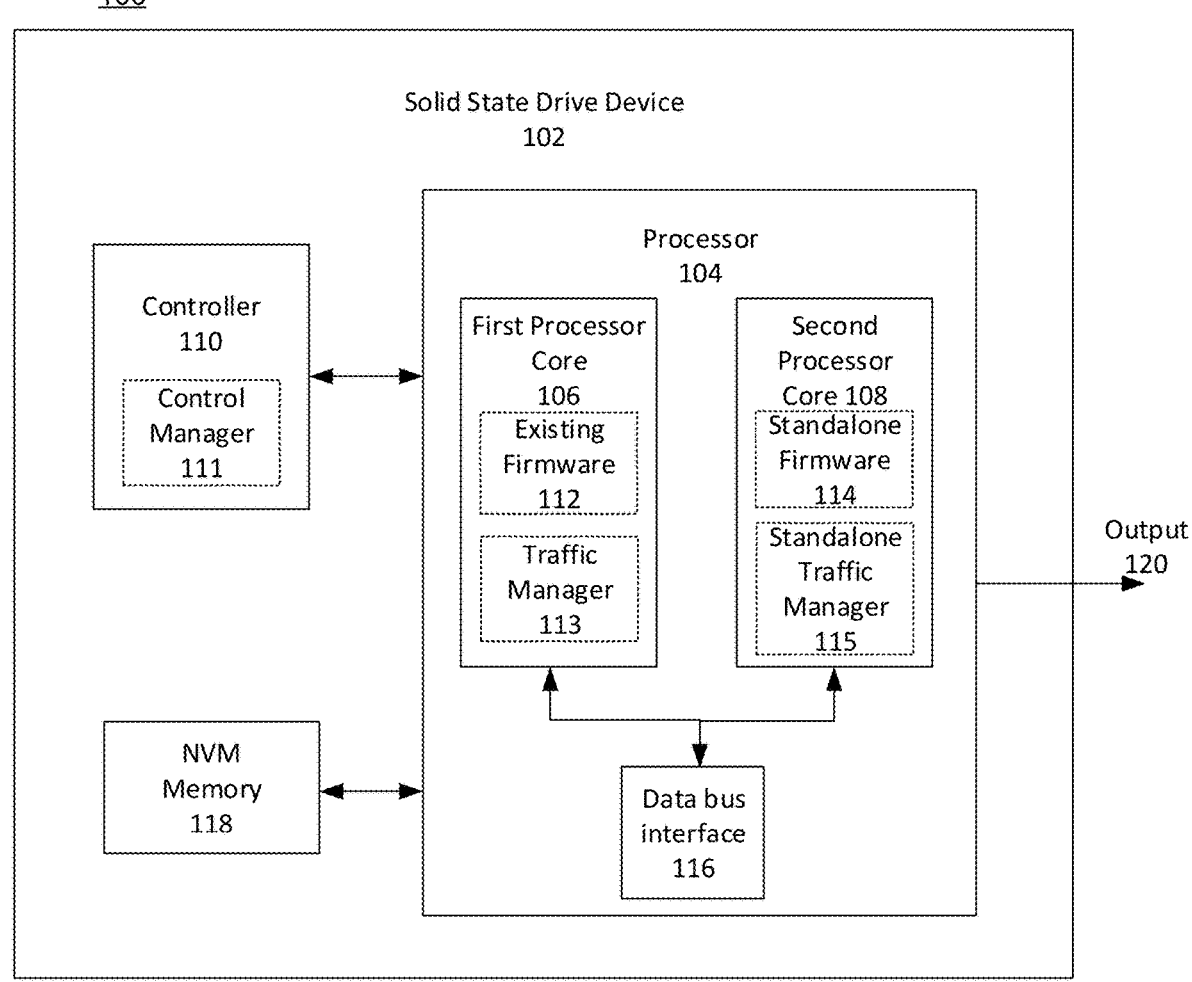
FIG. 1 shows an illustrative diagram of a system with a multi-core processor and controller, in accordance with some embodiments of the present disclosure.

In accordance with the present disclosure, systems and methods are provided for updating firmware on a first processor core that is currently processing transactions. The features of the present disclosure related to updating firmware on a device are applicable to devices having multiple processors, one or more multi-core processors, or both. For example, in some embodiments, the device is as a solid state drive (SSD) device that has a multi-core processor with a buffer of read and write commands for execution by the processor cores. A multi-core processor allows for multiple instructions to execute concurrently by using multiple cores with shared data and instruction memory. For example, each processor core may receive a command from the buffer in order and process each command such that there are no data hazards or conflicts in writing or reading to memory of the SSD device. A multi-core processor is useful to concurrently process multiple instructions of a program or concurrently run multiple programs. It will be understood that while the present disclosure is described primarily in the context of devices having a multi-core processor, the features of the present disclosure can be similarly applied to distinct processors (whether uni-core, multi-core, or both).

In some embodiments, the firmware of the processor cores of this example SSD device may need to be updated. Firmware of a processor may include a set of instructions or microcode needed to define the functionality of the processor. Firmware is loaded onto a processor core of the processor as microcode that is stored in a reserved region of local memory that is accessible to the processor. When a firmware update request is received by, for example, an SSD controller in the SSD device, the first processor core might be executing commands or instructions, and further commands or instructions might be temporarily stored in a buffer waiting to be executed. The firmware of the first processor core cannot be updated while it is processing transactions because an update in the firmware can change how a processor should manage and execute transactions, and because the transactions were sent to be processed by the firmware that is currently loaded onto the first processor.

In some embodiments, an available processor core (i.e., that is not executing any commands or instructions) is identified. For example, the SSD device may store an available status bit for each processor core that indicates whether the respective processor core is currently on standby and available to process commands or instructions. In some embodiments, the status bits may be stored as a data structure (e.g., an array, a bitmap, etc.) in a non-volatile memory or a volatile memory. When the second processor core is determined to be available by checking its available status bit, data associated with processing the commands or instructions, as well as links to the controller and connections to external devices are migrated from the first processor core to the second (i.e., available) processor core. In this way, the second processor core mirrors the operating state and role of the first processor core in order for the first processor core to become available for a dynamic firmware update. When the first processor core becomes available by checking its available status bit, the dynamic firmware update application restarts the first processor core. The restart clears any volatile memory associated with the core and flushes out any out-of-date data within the first processor core, corresponding firmware, and traffic manager. In some embodiments, there may be additional processor cores to restart other than the first processor core. Once every processor core except the second processor core has restarted, the controller may update the firmware for each of these restarted processor cores. The existing firmware on the first processor core is replaced with the new firmware. In some embodiments, the new firmware may include a new traffic manager, input/output porting of the first processor core as well as updates to the transport protocol (e.g., PCIe, Ethernet, etc.). Data associated with an operating state of the existing firmware on the second processing core is then migrated to the first processor core. Once the new firmware is loaded onto the first processor core, the first processor core is available to execute transactions. The operating state of the firmware on the second processor core includes a firmware state, connectivity states to external devices (e.g., PCIe devices, Ethernet devices, etc.), traffic manager, and outstanding transactions of the second processor core. The dynamic firmware update application stops the transaction execution of the second processor core. Finally, the dynamic firmware update application causes the first processor core to execute transactions using the new firmware. The first processor core continues to execute transactions with the new firmware.

The subject matter of this disclosure may be better understood by reference to FIGS. 1-6.

FIG. 1 shows an illustrative diagram of a system 100 with a multi-core processor 104 and controller 110, in accordance with some embodiments of the present disclosure. In some embodiments, system 100 may include SSD device 102, which includes a multi-core processor 104, with a first processor core 106, a second processor core 108, and a data bus interface 116. It will be understood that the embodiments of the present disclosure are not limited to solid state drives (SSDs). For example, in some embodiments, the system 100 may include a hard disk drive (HDD) device in addition to or in place of the SSD.

An SSD device, such as SSD device 102 is a data storage device that uses integrated circuit assemblies as memory to store data persistently. SSD devices have no moving mechanical components, and this distinguishes SSDs from traditional electromechanical magnetic disks, such as, hard disk drives (HDDs) or floppy disks, which contain spinning disks and movable read/write heads. Compared to electro-mechanical disks, SSDs are typically more resistant to physical shock, run silently, have lower access time, and less latency.

Many types of SSDs use NAND-based flash memory which retains data without power and include a type of non-volatile storage technology. For example, in some embodiments, the SSD may use a NAND-based flash memory, a NOR-based flash memory, or any other non-volatile memory, or any combination thereof. Quality of Service (QOS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

The first processor core 106 is currently running an existing firmware 112, which is the firmware that will be updated by the dynamic firmware update application. The existing firmware is also loaded onto the second processor core 108. In some embodiments the firmware loaded onto the second processor core 108 is referred to as the standalone firmware 114 because the second processor core 108 is a single, available processor core that continues to run while all other processor cores, including the first processor core 106, update firmware. Additionally, SSD device 102 includes a controller 110 and non-volatile memory 118. In some embodiments, the non-volatile memory 118 includes any one or more of a Phase Change Memory (PCM), a PCM and switch (PCMS), a Ferroelectric Random Access Memory (FeRAM), or a Ferroelectric Transistor Random Access Memory (FeTRAM), and a Magnetoresistive Random Access Memory (MRAM), any other suitable memory, or any combination thereof. The first processor core 106, the second processor core 108, and data bus interface 116 are communicatively coupled to each other through a data bus in the processor 104. In some embodiments, the data bus interface 116 may transport data packets with a Peripheral Component Interconnection Express (PCIe) protocol to devices that are PCIe compatible. In some embodiments, the data bus interface 116 may transport data packets under an Ethernet protocol to devices that are Ethernet compatible. In some embodiments, the data bus interface 116 may transport data packets with shared processor memory. The data bus provides a network bus for data migrations between the first processor core 106 and second processor core 108, as well as reading or writing data through the data bus interface 116 from other components such as the non-volatile memory 118. The migration between the two processor cores includes data associated with the operating states of one of the processor cores. In some embodiments, the data includes a firmware state, connectivity states to external devices (e.g., PCIe devices, Ethernet devices), and outstanding transactions of another processor core. Processor 104 may include a hardware processor, a software processor (e.g., a processor emulated using a virtual machine), or any combination thereof. Controller 110, also referred to herein as control circuitry, may include any suitable software, hardware, or both for controlling the data bus interface 116, data migration and firmware updates. Controller 110 is communicatively coupled to the processor 104 to, for example, send instructions for processor firmware updates. Non-volatile memory 118 may include hardware elements for non-transitory storage of commands or instructions, that, when executed by processor 104, cause processor 104 to operate in accordance with embodiments described herein.

While the present disclosure is described primarily in the context of, for example, solid state drive device 102 having a multi-core processor 104, the features of the present disclosure can be similarly applied to distinct processors (whether uni-core, multi-core, or both). Therefore, solid state drive device 102 may include multiple processors, wherein each processor core of a first processor loaded with existing firmware needs a firmware update and the solid state drive device 102 is capable of migrating data and the existing firmware to a processor core on a second processor.

The controller 110 includes a control manager 111 that links with the traffic manager 113 and the standalone traffic manager 115 of the first processor core 106 and the second processor core 108, respectively. The control manager 111 is configured to send control signals from the controller to each of the processor cores 106, 108. The traffic manager 113 and the standalone traffic manager 115 provide command or instruction management as they are received by the first processor core 106 and the second processor core 108, respectively. The traffic manager 113 and standalone traffic manager 115 are set up to follow a transport protocol (e.g., PCIe, Ethernet, etc.) that is compatible with external devices, that are communicatively coupled to the system output 120.

Solid state storage devices (for example, SSD devices) may include one or more packages of non-volatile memory dies, where each die includes storage cells. In some embodiments, the storage cells are organized into pages, and pages are organized into blocks. Each storage cell can store one or more bits of information. The solid state storage device may further include a multi-core processor and storage controller. In some embodiments, Input/Output (I/O) commands from an external device, for example, write commands are buffered in a temporary storage (buffer) in the SSD storage device before being processed against memory or storage cells.

It will be understood that, while system 100 depicts an embodiment in which an SSD device on a PCIe interface is configured to have its firmware updated in accordance with the present disclosure, any other suitable device on another suitable interface can have its firmware updated in a similar manner. For example, an Ethernet device may have its firmware updated by a network controller. In some embodiments, other storage devices, peripheral devices, or other devise on a PCIe interface may have firmware updated on one or more processors or processor cores.

For purposes of clarity and brevity, and not by way of limitation, the present disclosure is provided in the context of a dynamic firmware update application that provides the features and functionalities disclosed herein. The dynamic firmware update application can be any suitable software, hardware, or both for implementing such features and functionalities. The dynamic firmware update application can be at least partially implemented in, for example, system 100 (e.g., as part of SSD device 102, or any other suitable device on which the firmware is being updated). For example, in the example of SSD device 102, the dynamic firmware update application can be implemented in controller 110. In some embodiments, dynamic firmware update application can be at least partially implemented as part of an operating system for a system in which system 100 is integrated. In some embodiments, dynamic firmware update application can be at least partially implemented in dedicated circuitry (e.g., as a processor or as one or more processor cores).

FIG. 2 shows a flowchart illustrating a process 200 for updating the existing firmware of the first processor while continuing to execute transactions on the second processor core, in accordance with some embodiments of the present disclosure. In some embodiments, the referenced traffic manager, standalone traffic manager, first processor core, second processor core and the controller may be implemented as traffic manager 113, standalone traffic manager 115, first processor core 106, second processor core 108, and controller 110, respectively. In some embodiments, the process 200 can be modified by, for example, having steps rearranged, changed, added, and/or removed.

At step 202, the dynamic firmware update application receives a request to update the existing firmware to a new firmware. Generally, the first processor core will have outstanding transactions to execute when the firmware update request is received by the controller. However, the dynamic firmware update application determines when the second processor core has completed execution and is available in order for this dynamic firmware update to execute. For example, in some embodiments, the dynamic firmware update application may determine that the second processor core is available using a status bit associated with the second processor core. The dynamic firmware update application then loads the existing firmware onto the second processor core, at step 204.

At step 204, the dynamic firmware update application loads the existing firmware on the second processor core. The existing firmware, which is also currently running on the first processor core, is loaded onto the second processor core to ensure firmware compatibility between the first processor core and the second processor core. Both of the processor cores should have the same existing firmware to avoid any differences in transaction execution when the dynamic firmware update application migrates data associated with the operating state of first processor core to the second processor core, at step 206.

At step 206, the dynamic firmware update application migrates data associated with an operating state of the existing firmware on the first processor core to the second processor core. Sending data from the first processor core to the second processor core includes packaging the data into packets to be sent along the data bus interface and received by the second processor core. The operating state of the firmware on the first processor core includes a firmware state, connectivity states to external devices and outstanding transactions of the first processor core.

At step 208, the dynamic firmware update application causes the first processor core to stop executing transactions. The dynamic firmware update application has completed a hand-off from the first processor core to the second processor core, therefore the first processor core should stop executing transactions, so that the second processor core can continue the execution of outstanding transactions as the firmware update process resumes. Once the second processor core stops executing transactions, it is available and may remain available until after updating to the new firmware.

At step 210, the dynamic firmware update application causes the second processor core to execute transactions using the existing firmware in place of the first processor core. The second processor core continues the execution of outstanding transactions where the first processor core handed-off. The second processor core loaded with the existing firmware allows for the execution of outstanding transactions while the dynamic firmware update application restarts and updates the firmware on the first processor core. Additionally, the standalone traffic manager of the second processor core will store any newly received transactions into a buffer during while the second processor core is executing.

At step 212, the dynamic firmware update application restarts the first processor core. The restart clears any volatile memory associated with the core and flushes out any out-of-date data within the processor cores, corresponding firmware, and traffic manager. In some embodiments, there may be additional processor cores to restart other than the first processor core. Once every processor core except the second processor core has restarted, the dynamic firmware update application may update the firmware for each of these restarted processor cores.

At step 214, the dynamic firmware update application replaces the existing firmware on the first processor core with the new firmware. The new firmware may include a different traffic manager, Input/Output porting of the first processor core as well as updates to the transport protocol (e.g., PCIe, Ethernet, etc.). The new firmware may have been previously stored in the non-volatile memory 118, to which the controller is communicatively coupled, or may be received from a database that the controller is communicatively coupled to through wireless communications. However, the existing firmware need not necessarily be overwritten, deleted, or otherwise modified on the first processing core.

At step 216, the dynamic firmware update application migrates data associated with an operating state of the existing firmware on the second processing core to the first processor core. Once the new firmware is loaded onto the first processor core, the first processor core is available to execute transactions. The operating state of the firmware on the second processor core includes a firmware state, connectivity states to external devices (e.g., PCIe devices, Ethernet devices, etc.), traffic manager, and outstanding transactions of the second processor core.

At step 218, the dynamic firmware update application causes the second processor core to stop executing transactions. After the data migration from the second processor core to the first processor core, the second processor core does not have any more outstanding transactions to execute, therefore it can stop transaction execution.

At step 220, the dynamic firmware update application causes the first processor core to execute transactions using the new firmware. The first processor core continues to execute transactions with the new firmware. In some embodiments with additional processor cores, the additional processor cores are also available for executing transactions with the new firmware.

Figure 3:
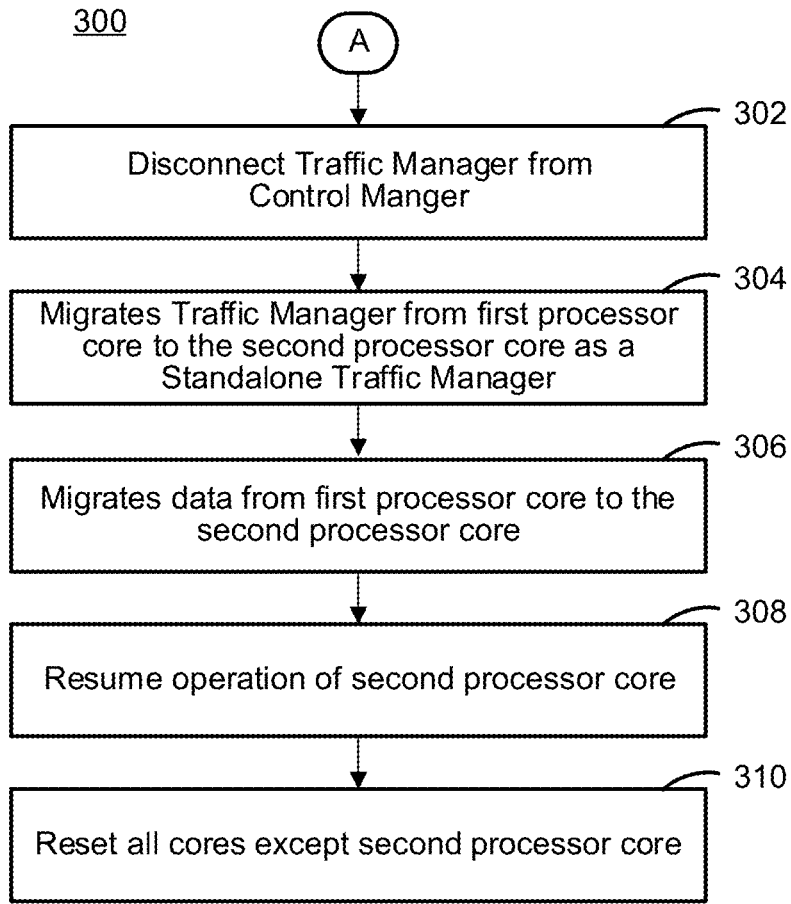
FIG. 3 shows a flowchart illustrating a process for migrating data from the first processor to the second processor, in accordance with some embodiments of the present disclosure.

FIG. 3 shows a flowchart illustrating a process 300 for migrating data from the first processor to the second processor, in accordance with some embodiments of the present disclosure. Subprocess 300 is executed as a portion of the process for updating an existing firmware currently operating on the first processor core while continuing to execute transactions. In some embodiments, the referenced traffic manager, standalone traffic manager, first processor core, second processor core, control manager and the controller are traffic manager 113, standalone traffic manager 115, first processor core 106, second processor core 108, control manager 111, and controller 110, respectively. In some embodiments, the process 300 can be modified by, for example, having steps rearranged, changed, added, and/or removed.

At step 302, the dynamic firmware update application disconnects the traffic manager from the control manager. In some embodiments, the control manager is linked to the traffic manager in order to send control signals from the controller to the first processor core. In the embodiment shown in the flowchart, the existing firmware of the first processor core is to be updated to a new firmware, while there are still outstanding transactions to be executed. However, when updating the firmware by replacing the existing firmware with the new firmware, the first processor core cannot process the outstanding transactions. Therefore, the link between the traffic manager and the control manager may be broken.

At step 304, the dynamic firmware update application migrates the traffic manager from the first processor core to the second processor core as a standalone traffic manager. Migrating the traffic manager to the standalone traffic manager includes linking the standalone traffic manager to the control manager and ensuring that the standalone is configured to output signals from the system output to the external devices with certain transport protocols (e.g., PCIe, Ethernet).

At step 306, the dynamic firmware update application migrates data from the first processor core to the second processor core. The data migrated may include outstanding transactions, operating states, and connectivity states. This data may be used to configure the firmware and standalone traffic manager of the second processor core, wherein the second processor core can execute and continue to receive commands or instructions as the firmware of the first processor core updates.

At step 308, the dynamic firmware update application resumes the operation of the second processor core. In some embodiments, the second processor core will resume the execution of transactions where the first processor core last left off before the first processor core stopped transaction execution. In some embodiments, an instructions pointer may be stored and updated for every command or instruction processed by a core. This instruction pointer may also be moved as part of the data migration between the first processor core and the second processor core. Therefore, by using the same configuration of traffic manager, transport layer protocol, and connections to the control manager and external device, the second processor core should operate as a mirror of the first processor core, as the firmware of the first processor core is updated.

At step 310, the dynamic firmware update application resets all cores except the second processor core. While the second processor core is set up and begins executing transactions, the first processor core is reset in order to clear any volatile memory associated with the first processor core and flushes out any out-of-date data within or associated with the first processor core, corresponding firmware, and traffic manager. In some embodiments, there may be additional processor cores to reset other than the first processor core. In some embodiments, the reset of the processor cores may be completed by a warm reboot, wherein the existing firmware and traffic manager of each processor core are reset without removing power of each processor core.

While this subprocess 300 is used for the data migration and firmware setup of the second processor core, the subprocess 300 only allows for every processor core except the second processor core to reset for a firmware update. The methods of the present disclosure also allow the second processor core to be available for a firmware update by handing off the transaction execution back to the first processor core once every processor core except the second processor core has booted updated firmware.

Figure 4:
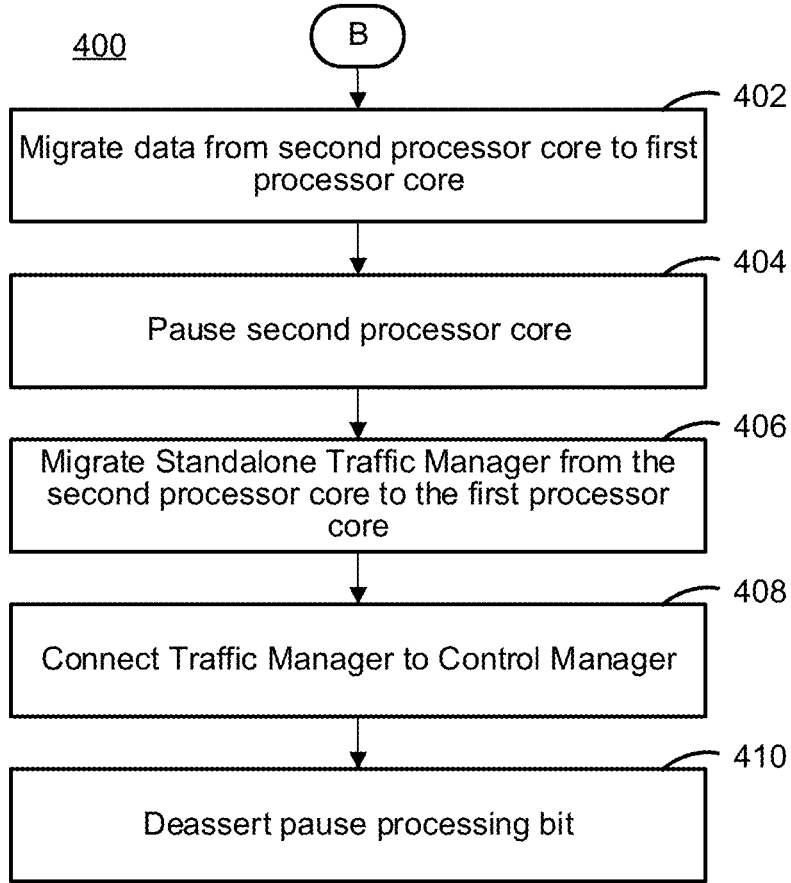
FIG. 4 shows a flowchart illustrating a process for migrating data from the second processor core to the first processor core and resuming the execution of transactions on the first processor core, in accordance with some embodiments of this disclosure.

FIG. 4 shows a flowchart illustrating a process 400 for migrating data from the second processor core to the first processor core and resuming the execution of transactions on the first processor core, in accordance with some embodiments of this disclosure. Subprocess 400 is executed as a portion of the process for updating an existing firmware currently operating on the first processor core while continuing to execute transactions. In some embodiments, the referenced traffic manager, standalone traffic manager, first processor core, second processor core, control manager and the controller are traffic manager 113, standalone traffic manager 115, first processor core 106, second processor core 108, and control manager 111 and controller 110, respectively, as seen in FIG. 1. In some embodiments, the process 400 can be modified by, for example, having steps rearranged, changed, added, and/or removed.

At step 402, the dynamic firmware update application migrates data from the second processor core to the first processor core. The existing firmware of the first processor core has been updated to the new firmware, and the first processor core is available for transaction execution. The data migration from the second processor core to the first processor core is a hand-off of transaction execution responsibility in order to make the second processor core available for a firmware update if necessary. The data migration may include outstanding transactions, an instruction pointer, operating states, and connectivity states. This data may be used to configure the new firmware and traffic manager of the first processor core, wherein the first processor core can execute and continue to receive commands or instructions through the traffic manager, similarly to before the firmware update.

At step 404, the dynamic firmware update application pauses the second processor core. The second processor core has handed off any further outstanding transactions to the first processor core, and therefore the second processor core is paused to ensure that there is no further execution of transactions which may cause any conflicts or hazards between the first processor core and the second processor core.

At step 406, the dynamic firmware update application migrates the traffic manager from the second processor core to the first processor core. The second processor core is no longer processing transactions, and therefore the standalone traffic manager may be migrated from the second processor core to configure the traffic manager of the first processor core. Additionally, the migration includes disconnecting the standalone traffic manager from the control manager of the controller.

At step 408, the dynamic firmware update application connects the traffic manager of the first processor core to the control manager of the controller. The dynamic firmware update application links the control manager to the traffic manager such that the control manager can send control signals to the traffic manager of the first processor core. Linking the traffic manager of the first processor core to the control manager includes configuring the traffic manager to output signals from the system output to the external devices with certain transport layer protocols (e.g., PCIe, Ethernet).

At step 410, the dynamic firmware update application deasserts pause processing bit. A pause processing bit is a control signal bit used by the system to easily determine whether a processor core is paused in its operation. In some embodiments, there is a pause processing bit for each of the processor cores in the processor. The pause processing bits may be stored in a volatile memory in the form of a searchable data structure (e.g., a look-up table, an array, etc.).

Figure 5:
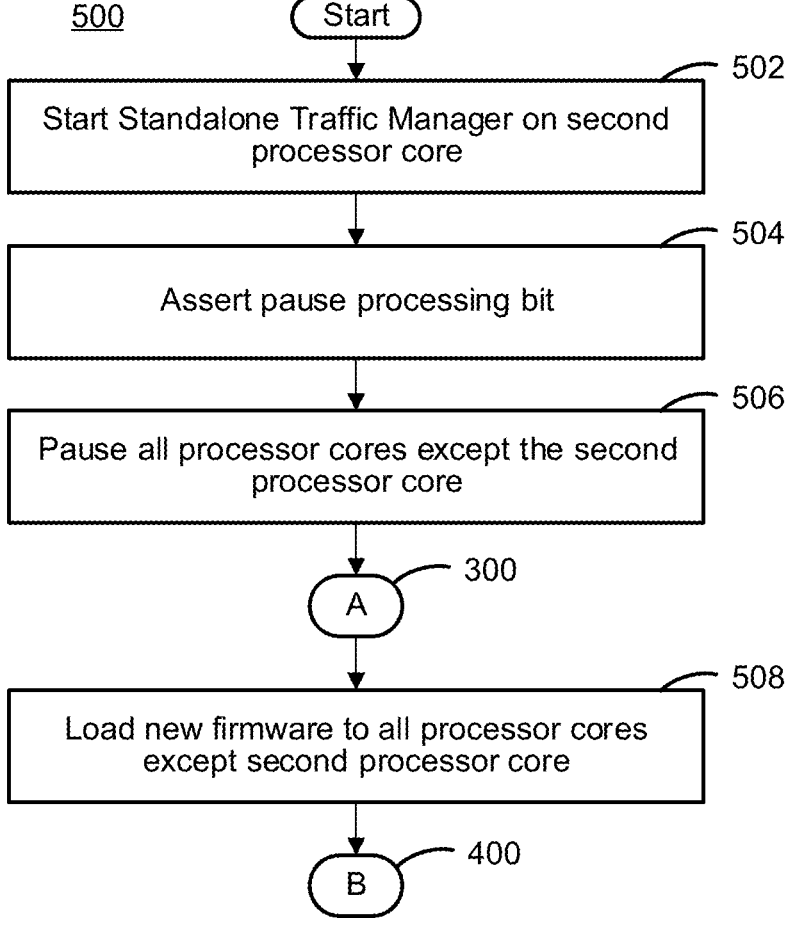
FIG. 5 shows a flowchart illustrating a process for updating the existing firmware of the first processor core while continuing to execute transactions on the second processor core, in accordance with some embodiments of the present disclosure.

FIG. 5 shows a flowchart illustrating a process 500 for updating the existing firmware of the first processor core while continuing to execute transactions on the second processor core, in accordance with some embodiments of the present disclosure. In some embodiments, the process 500 can be modified by, for example, having steps rearranged, changed, added, and/or removed.

At step 502, the dynamic firmware update application starts the standalone traffic manager on the second processor core. The standalone traffic manager is initialized on the second processor core, available for processing transactions when the existing firmware of the first processor core is updated to the new firmware.

At step 504, the dynamic firmware update application asserts a pause processing bit. The dynamic firmware update application sets and asserts a pause processing bit for the first processor core to indicate that the operation of the first processor core is paused. In embodiments with more than two processor cores, the dynamic firmware update application sets the pause processing bit for each processor core except the second processor core.

At step 506, the dynamic firmware update application pauses all processor cores except the second processor core. The dynamic firmware update application may pause the processor cores in parallel to the asserting the pause processing bit for each processor cores with exception to the second processor core.

At subprocess 300, the dynamic firmware update application executes subprocess 300, which migrates the data from the first processor to the second processor.

At step 508, the dynamic firmware update application loads new firmware to all processor cores except the second processor core. The dynamic firmware update application boots the new firmware on each of the processor cores except the second processor core, while the second processor core continues to receive and execute transactions. When the new firmware is completely booted onto the processor cores, each of the newly updated processor cores are available for processing, with an assertion check on the pause processing bit for the processor cores.

At subprocess 400, the dynamic firmware update application executes subprocess 400, which migrates data from the second processor core to the first processor core and resuming the execution of transactions on the first processor core.

Figure 6:
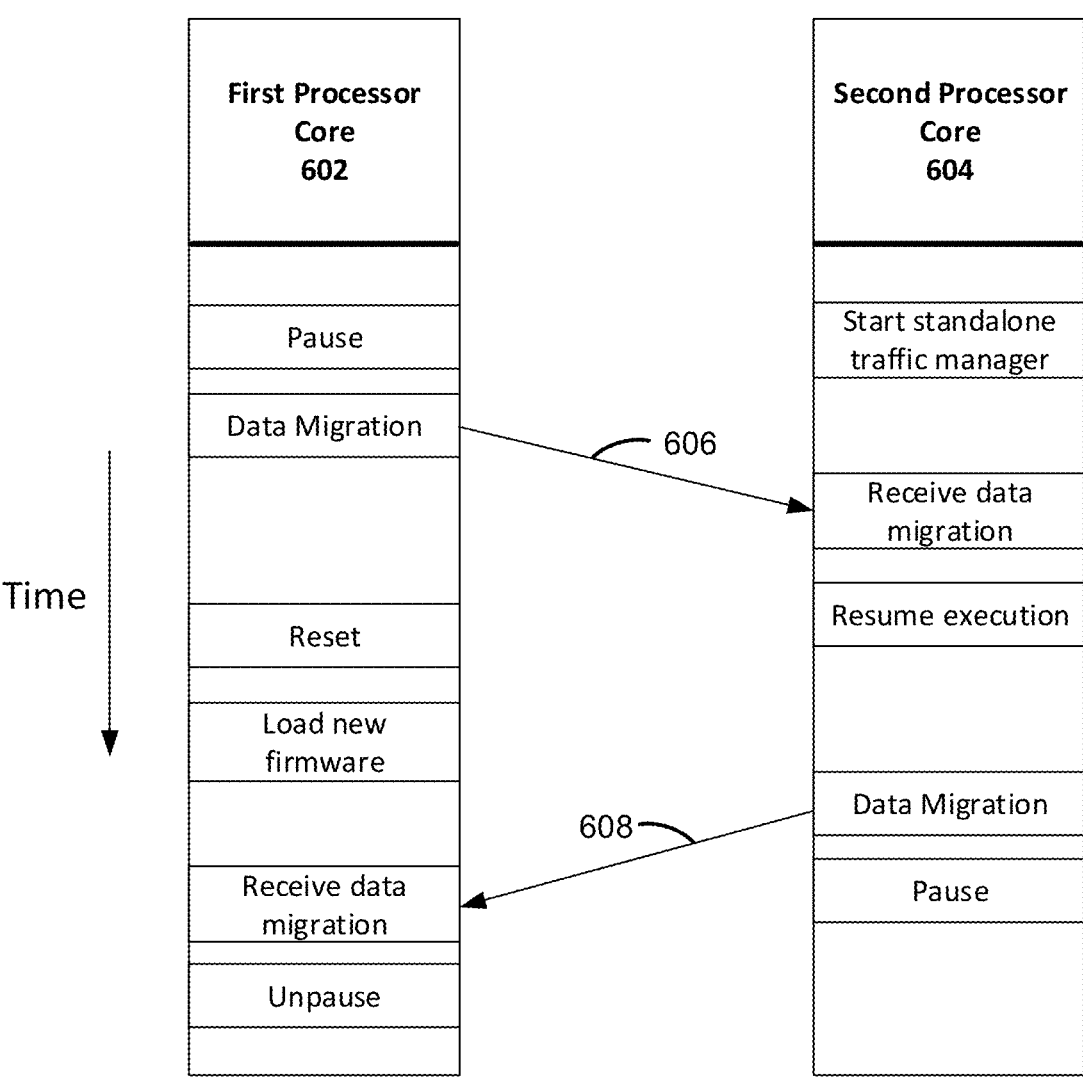
FIG. 6 shows a diagram illustrating chronological data flow between first and second processor cores that concurrently execute programs or routines, in accordance with some embodiments of the present disclosure.

FIG. 6 shows a diagram illustrating chronological data flow between first and second processor cores that concurrently execute programs or routines, in accordance with some embodiments of the present disclosure. Each timeline 602, 604 is represented by columns that follow a vertically sequential order for each processor core, with a time variable indicator. The timelines indicate a relative parallelism between the execution stages of the first processor core and the second processor core. Additionally, FIG. 6 shows the data migrations 606, 608 between the two processor cores, which are routines that require meeting timing restraints in order to avoid any write or read conflicts or hazards. For example, the second processor core cannot resume execution until the first data migration 606 has been received by the second processor core. However, while the second processor core is executing transactions, the first processor core may reset and load the new firmware.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method for modifying a processor core of a plurality of processor cores, the method comprising:

identifying a first software executing on a first processor core of the plurality of processor cores;

loading the first software on a second processor core of the plurality of processor cores;

migrating first data associated with an operating state of the first software on the first processor core to the second processor core;

causing the first processor core to stop executing the first software;

causing the second processor core to execute the first software based on the first data;

loading a second software on the first processor core;

migrating second data associated with an operating state of the first software on the second processor core to the first processor core; and causing the first processor core to execute the second software based on the second data.

2. The method of claim 1, wherein the first processor core and the second processor core are coupled to a peripheral component interconnect express (PCIe) interface.

3. The method of claim 1, wherein the first processor core and the second processor core are coupled to an ethernet interface.

4. The method of claim 1, further comprising determining that the second processor core is available.

5. The method of claim 1, wherein migrating first data associated with the operating state of the first software on the first processor core to the second processor core comprises loading the first data associated with the operating state of the first software on the first processor core onto an available area of memory associated with the second processor core.

6. The method of claim 1, wherein the first data associated with the operating state of the first software on the first processor core and the second data associated with the operating state of the first software on the second processor core respectively comprise:

a plurality of outstanding transactions;

a state of the first software; and an input/output connectivity state of the first software.

7. The method of claim 1, further comprising restarting the first processor core, wherein the restarting the first processor core occurs after the second processor core begins to execute the first software based on the first data and before loading the second software on the first processor core.

8. A system comprising:

a plurality of processor cores; and control circuitry, wherein the control circuitry is communicatively coupled to the plurality of processor cores, the control circuitry configured to:

identify a first software executing on a first processor core of the plurality of processor cores;

load the first software on a second processor core of the plurality of processor cores;

migrate first data associated with an operating state of the first software on the first processor core to the second processor core;

cause the first processor core to stop executing the first software;

cause the second processor core to execute the first software based on the first data;

load a second software on the first processor core;

migrate second data associated with an operating state of the first software on the second processor core to the first processor core; and cause the first processor core to execute the second software based on the second data.

9. The system of claim 8, wherein the first processor core and the second processor core are coupled to a peripheral component interconnect express (PCIe) interface.

10. The system of claim 8, wherein the first processor core and second processor core are coupled to an ethernet interface.

11. The system of claim 8, wherein the control circuitry is further to determine that the second processor core is available.

12. The system of claim 8, wherein the control circuitry is to load the first data associated with the operating state of the first software on the first processor core onto an available area of memory associated with the second processor core.

13. The system of claim 8, wherein the first data associated with the operating state of the first software on the first processor core and the second data associated with the operating state of the first software on the second processor core respectively comprise:

a plurality of outstanding transactions;

a state of the first software; and an input/output connectivity state of the first software.

14. The system of claim 8, wherein the control circuitry is further to restart the first processor core after the second processor core begins to execute the first software based on the first data and before loading the second software on the first processor core.

15. A solid state drive (SSD) device comprising:

a plurality of processor cores; and a controller, wherein the controller is communicatively coupled to the plurality of processor cores, the controller configured to:

identify a first software executing on a first processor core of the plurality of processor cores;

load the first software on a second processor core of the plurality of processor cores;

migrate first data associated with an operating state of the first software on the first processor core to the second processor core;

cause the first processor core to stop executing the first software;

cause the second processor core to execute the first software based on the first data;

load a second software on the first processor core;

migrate second data associated with an operating state of the first software on the second processor core to the first processor core; and cause the first processor core to execute the second software based on the second data.

16. The SSD device of claim 15, wherein the first processor core and the second processor core are coupled to a peripheral component interconnect express (PCIe) interface.

17. The SSD device of claim 15, wherein the first processor core and second processor core are coupled to an ethernet interface.

18. The SSD device of claim 15, wherein the controller is further to determine that the second processor core is available.

19. The SSD device of claim 15, wherein the controller is to load the first data associated with the operating state of the first software on the first processor core onto an available area of memory associated with the second processor core.

20. The SSD device of claim 15, wherein the first data associated with the operating state of the first software on the first processor core and the second data associated with the operating state of the first software on the second processor core respectively comprise:

a plurality of outstanding transactions;

a state of the first software; and an input/output connectivity state of the first software.

21. The SSD device of claim 15, wherein the controller is further to restart the first processor core after the second processor core begins to execute the first software based on the first data and before loading the second software on the first processor core.

* * * * *